(12) United States Patent
Park et al.

(10) Patent No.: US 7,543,047 B2
(45) Date of Patent: Jun. 2, 2009

(54) METHOD FOR DATA SYNCHRONIZATION AND UPDATE CONFLICT RESOLUTION BETWEEN MOBILE CLIENTS AND SERVER IN MOBILE SYSTEM

(75) Inventors: Joong-Ki Park, Taejon (KR); Joong Bae Kim, Taejon (KR); Duk Joo Son, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 736 days.

(21) Appl. No.: 10/422,843

(22) Filed: Apr. 25, 2003

(65) Prior Publication Data

US 2004/0122870 A1 Jun. 24, 2004

(30) Foreign Application Priority Data

Dec. 24, 2002 (KR) .................. 10-2002-0083160

(51) Int. Cl.
*G06F 15/177* (2006.01)
(52) U.S. Cl. ...................... 709/221; 707/201
(58) Field of Classification Search ........... 709/221; 707/200–202
See application file for complete search history.

(56) References Cited

U.S. PATENT DOCUMENTS

| 6,219,675 | B1 | | 4/2001 | Pal et al. | |
|---|---|---|---|---|---|
| 6,289,357 | B1 | | 9/2001 | Parker | |
| 6,393,434 | B1 | | 5/2002 | Huang et al. | |
| 6,636,873 | B1 | * | 10/2003 | Carini et al. | ................ 707/201 |
| 6,789,103 | B1 | * | 9/2004 | Kim et al. | ................... 709/203 |
| 6,810,405 | B1 | * | 10/2004 | LaRue et al. | ................ 707/201 |
| 7,024,429 | B2 | * | 4/2006 | Ngo et al. | .................... 707/201 |
| 2003/0055825 | A1 | * | 3/2003 | Chen et al. | ..................... 707/10 |
| 2003/0149709 | A1 | * | 8/2003 | Banks | ......................... 707/200 |
| 2006/0059208 | A1 | * | 3/2006 | Chen et al. | ................. 707/201 |

* cited by examiner

*Primary Examiner*—Andrew Caldwell
*Assistant Examiner*—Benjamin Ailes
(74) *Attorney, Agent, or Firm*—Lowe Hauptman Ham & Berner, LLP

(57) ABSTRACT

Disclosed is a method for data synchronization and update conflict resolution between mobile clients and a server in a mobile system which maintains consistency of data between the clients and the server and enables the clients to continuously perform an effective update operation with respect to objects of the server even in a clients' disconnection state by the mobile clients performing an independent update operation with respect to disjoint fragments and associated objects for a specified object using the structure of the objects and the meaning of applications and then performing the data synchronization and the conflict resolution between the clients and the server during a reconnection operation. The method includes a copy management step of copying data of a server-side DB into a client-side built-in DB and the server managing contents of copying and a copying time, a data synchronization step of synchronizing changed data between the mobile clients and the DB server with respect to a data change produced during the mobile clients' disconnection state in accordance with a request of the mobile clients after a reconnection of the mobile clients, and a conflict detection and resolution step of detecting an error that damages consistency of the data in the data synchronization process and resolving the detected error.

15 Claims, 1 Drawing Sheet

SX: CHECKOUT SUBSIDIARY OBJECT
LSN: Log Sequence Number
TS: Time Stamp
ClientIP: IP ADDRESS OF MOBILE CLIENT SX:CHECKOUT SUBSIDIARY OBJECT
LSN:Log Sequence Number
TS:Time Stamp
ClientIP: IP ADDRESS OF MOBILE CLIENT // METHOD FOR DATA SYNCHRONIZATION AND UPDATE CONFLICT RESOLUTION BETWEEN MOBILE CLIENTS AND SERVER IN MOBILE SYSTEM

BACKGROUND OF THE INVENTION

1. Field of the Invention

The present invention relates to a method for data synchronization and update conflict resolution between mobile clients and a server in a mobile system, and more particularly, to a method for data synchronization and update conflict resolution between mobile clients and a server in a mobile system which enables the clients to continuously perform an update operation with respect to objects of the server even in a clients' disconnection state by performing an independent update operation by copying disjoint fragments and associated objects for a specified object into a database of the client and maintaining consistency of data through data synchronization and conflict resolution with respect to changed items during a reconnection operation.

2. Background of the Related Art

Generally, since a communication means for a mobile electronic commerce is an unstable wireless network having a lower bandwidth than a wire network, and a portable information appliance has the limitations in resources such as a computing power, memory, storage space, etc., in comparison to a PC, the mobile electronic commerce has many restrictions in comparison to the existing PC-based electronic commerce.

Accordingly, in consideration of the characteristics of such a mobile electronic commerce environment is required a technique of copying required data through the wireless communication between mobile appliances and a server database system, performing a regional management and operation, and periodically or non-periodically synchronizing data between wireless appliances and a server system.

That is, in order to provide an effective information service to a mobile user, it is required to be capable of copying information into a server-side database of a wire environment that is a source of information using a mobile database as a small-scaled database mounted in a mobile communication appliance that is accessible to a mobile network, for example, an information appliance such as a PDA, notebook, mobile phone, etc.

Also, in consideration of the mobile electronic commerce and other application fields, an effective client-server data-synchronization method, which can overcome the restricted items of the mobile appliances, and a method for detection and resolution of an updated data conflict, which may be produced during the synchronization process, are required.

SUMMARY OF THE INVENTION

Accordingly, the present invention is directed to a method for data synchronization and update conflict resolution between mobile clients and a server in a mobile system, which substantially obviates one or more problems due to limitations and disadvantages of the related art.

It is an object of the present invention to provide a method for data synchronization and update conflict resolution between mobile clients and a server in a mobile system which maintains consistency of data between the clients and the server and enables the clients to continuously perform an effective update operation with respect to objects of the server even in a clients' disconnection state by the mobile clients performing an independent update operation with respect to disjoint fragments and associated objects for a specified object using the structure of the objects and the meaning of applications and then performing the data synchronization and the conflict resolution between the clients and the server during a reconnection operation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In order to achieve the above object, there is provided a method for data synchronization and update conflict resolution between a plurality of mobile clients and a database (DB) server in a mobile system, comprising a copy management step of copying data of a server-side DB into a client-side built-in DB and the server managing contents of copying and a copying time, a data synchronization step of synchronizing changed data between the mobile clients and the DB server with respect to a data change produced during the mobile clients' disconnection state in accordance with a request of the mobile clients after a reconnection of the mobile clients, and a conflict detection and resolution step of detecting an error that damages consistency of the data in the data synchronization process and resolving the detected error.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Figure 1:
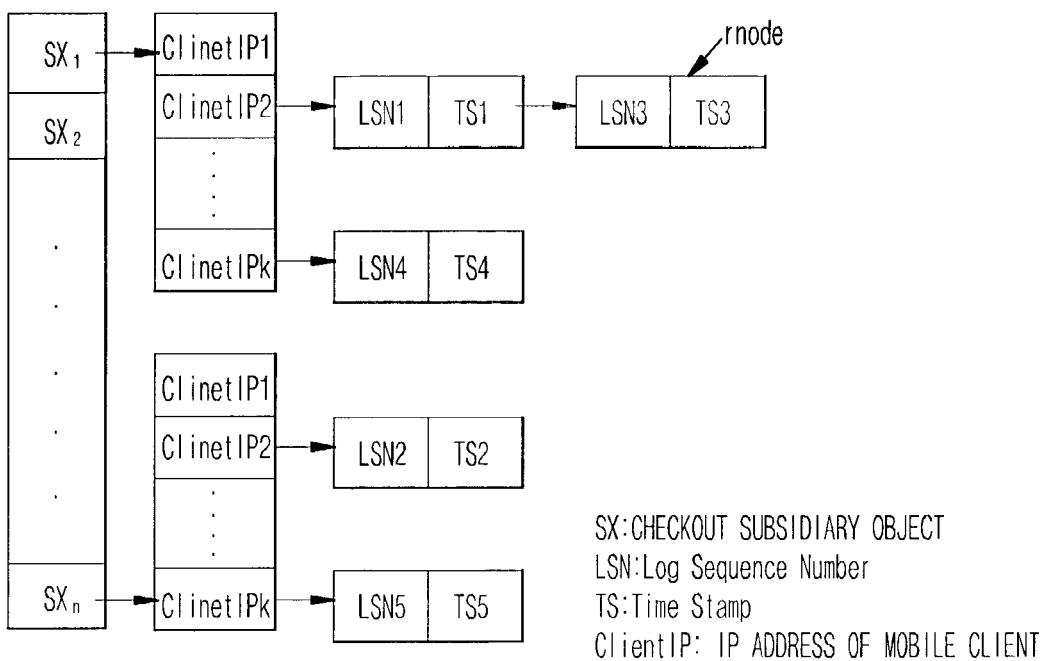
FIG. 1 is a view illustrating a data structure of an RC list according to the present invention.

The method for data synchronization and conflict resolution between mobile clients and a server in a mobile system according to the preferred embodiment of the present invention will now be explained in detail with reference to the accompanying drawings.

First, the data synchronization method between the mobile clients and the server according to the present invention is briefly composed of a copy management step, a data synchronization step, and a conflict detection and resolution step.

The copy management step copies data from a server-side database (DB) into a client-side built-in DB using a proper mechanism, and manages the contents of copying, copying time, etc.

The copying process is performed in a manner that the server publishes the data through one or more table combination, and the plurality of clients subscribe the publication that is the copying.

This copying method is called a publish/subscribe model.

The data synchronization step maintains the mutual data consistency in order to secure the efficiency of a transaction since the server-side data is copied into the client-side DB, and managed by a mobile DB management system (DBMS) of the client.

That is, the data synchronization step maintains the data equally through the change and the corresponding request that may be produced bi-directionally from the mobile DBMS and a server-side DBMS.

The conflict detection and resolution step is performed in a manner that the mobile DBMS detects the error that damages the data consistency with the server-side DB due to an insertion, removal, and update operation in the mobile DBMS in a state that the clients and the server are disconnected from each other, and properly resolve the error.

Hereinafter, the above-described steps along with definitions of important terms applied to the present invention will be explained in detail.

In the present invention, a checkout operation is for the mobile client to bring necessary data from the server for an operation during in the disconnection state, and a checkin operation is a process of combining the disjoint fragments of the checkout main object of the mobile client with the server DB.

Also, a checkout object is classified into a main object and a subsidiary object having a subordinate relation with the main object, which are defined as follows:

The checkout main object corresponds to disjoint fragments that are distributed to the plurality of clients for operation and do not overlap with each other. It is an object that is independently operated in the respective client, and can be re-combined with the consistency in meaning.

Accordingly, during performing an operation by checking out the disjoint fragments of the checkout main object distributed to a certain client, a direct write conflict with other clients is not produced. However, an indirect conflict caused by the subordinated relation with the checkout subsidiary object may be produced.

The checkout subsidiary is an object that is write-referred to during the performing of the transaction for the disjoint fragments of the checkout main object. It is cached together with the main object, and can be simultaneously cached as the subsidiary object many clients. It is used only for write in the client, and the update thereof is possible only in the server.

This checkout subsidiary object is cached together with the checkout main object in the respective client cites, and write-referred when the update operation is performed with respect to the disjoint fragments of the main object.

Also, the checkout subsidiary object is referred to in an adjustment work for maintaining the data consistency during the reconnection in order to resolve the conflict problem that may be produced between the client and the server.

The checkout main object X existing in the server as defined above is composed of two pairs of "checkout disjoint fragments" CX and "non-checkout disjoint fragments existing in the server" NCX in the case that certain clients have checked out the object X.

That is, the checkout main object at a certain time point is $X=<CX, NCX>$, and $CX \cap NCX = O$. The checkout disjoint fragment CX is composed of a set union of n checkout disjoint fragments $CXi$ ($1 \leq i \leq n$) distributed to the respective clients ($CX = CX1 \cup CX2 \ldots \cup CXn$, and $CXi \cap CXj = O$ with respect to all i and j where $1 \leq i, j \leq n$, $i \neq j$).

The checkout subsidiary object SX having a write-subordinate relation with the main object, which is write-referred to when the disjoint fragment CXi of the checkout main object X performs an independent operation in a certain mobile client, is copied into the client during the checkout, and thus duplicate copies of SX may exist in the server and the clients.

The certain mobile client, if a disconnection for a long time is expected, checks out the disjoint fragment CXi of the object to be used during the disconnection from the server, and copies the disjoint fragment into its own DB in order to continue the transaction process after the disconnection.

Meanwhile, the transaction, which is performed with respect to CXi of the mobile client, can be classified into an independent transaction and a referential transaction according to the kind of referred data.

The independent transaction (IT) is a transaction in case that only data of CXi is referred to, during the performing of the transaction T with respect to the disjoint fragment CXi of the checkout main object. That is, the independent transaction corresponds to the case that CXi does not have a write-subordinate relation with any object existing in the server.

The referential transaction (RT) is a transaction in case that data of other objects except for Cxi is referred to, during the performing of the transaction T with respect to the disjoint fragment CXi of the checkout main object. That is, the referential transaction corresponds to the case that CXi has a write-subordinate relation with a certain object SX existing in the server. This object SX corresponds to the checkout subsidiary object, and SX should also be checked out when CXi is checked out.

In case of performing the independent transaction with respect to the disjoint fragments of the checkout main object, the conflict is not produced even if the update operation is included according to the definition of the checkout main object and the independent transaction.

However, in case of performing the referential transaction, other clients can refer to and change the data of the checkout subsidiary object while this object is checked out. Thus, in case of using it in the disconnection state, the consistency problem may be produced.

While the disjoint fragment of the checkout main object is checked out to a mobile client, this mobile client becomes the master of the fragment, and is in a logically removed state that other clients cannot be viewed in the server DB until the checkin restarts. Accordingly, during the checkout period, other clients are in the state that other clients can neither check out the disjoint fragment again nor perform the write operation of the fragment.

If the mobile client performs the checkin of the fragment into the server, the master of this disjoint fragment becomes a server again, and allows all the clients to access the object.

Even if the checkout subsidiary object is checked out to the mobile client, the master of the object still remains as the server. That is, if another mobile client requests the checkout as the subsidiary object in a state that the checkout subsidiary object is checked out to the mobile client, this request will be allowed.

The mobile client that received the checkout subsidiary object should use the object for read only, and in case of performing a write operation for the object, the client requests a write lock to the server. The server, in order to maintain the consistency with duplicate copies stored in the remaining distributed clients except for the mobile clients that copied the object for the purpose of the checkout, uses a centralized two-phase locking method that is a locking protocol used as the simultaneity control method in a decentralized DB.

Meanwhile, the checkin or checkout operation process between the mobile client and the server will be explained.

When the mobile client intends to check out the disjoint fragments of the object required for operation during the disconnection from the DB server, the mobile client submits to the DB server information on the checkout main object name, fragmentation selection standard of the checkout main object, and checkout subsidiary object list.

Accordingly, the server performs a fragmentation of the corresponding object to be checked out as the main object in the DB according to the checkout main object fragmentation selection standard, and transmits the disjoint fragments and copies of the checkout subsidiary objects, which are in a write-subordinate relation with the disjoint fragments to the mobile client.

The fragmentation of the main subject as described above, in case of the relation type DB, corresponds to a horizontal fragmentation of the relation, and can specify the fragmentation standard in a WHERE conditional clause using a SELECT statement that includes the fragmentation selection standard.

Also, in the checkin operation process, the data consistency can be completed by simply replacing the main object fragmentation values stored in the server by the main object fragmentation values transmitted from the mobile client, but in case that the synchronization request for the duplicate copies of the subsidiary objects of the server which are in a write-subordinate relation with the main object and the subsidiary objects of the mobile client, the corresponding consistency adjustment work is required.

If there is no connection between the mobile client and the server even once for the checkout period, the synchronization work with the server should be performed with respect to the results of operation in the mobile client that was regionally performed, and if any conflict is produced during this process, a conflict resolution module appropriate to the conflict should be accompanied.

Meanwhile, the synchronization mechanism for the checked-out object according to the present invention is composed of a reconciliation list (hereinafter referred to as an RC list) and a reconciliation protocol (hereinafter referred to as an RC protocol).

The RC list is a list for storing information required for the reconciliation work after the mobile client, which is in the disconnection state, connects to the server when the write operation is performed with respect to the checkout subsidiary object checked out to the mobile client.

If the mobile client requests the synchronization to the server, the reconciliation work is performed based on the information in the RC list.

FIG. 1 is a view illustrating a data structure of an RC list according to the present invention.

The main constituent element mode of the RC list includes write operation information on the checkout subsidiary object that is not transmitted to the mobile client.

The mode is composed of two parts, a log sequence number (LSN) and a time stamp (TS). The LSN is a log record number for a specified write operation of the checkout subsidiary object in a log file maintained by the server DB, and the TS is information on a write-operation performing time that is recorded in the log record corresponding to the LSN.

ClientIP denotes an IP address of the mobile client having checked out the checkout subsidiary object.

Figure 2:
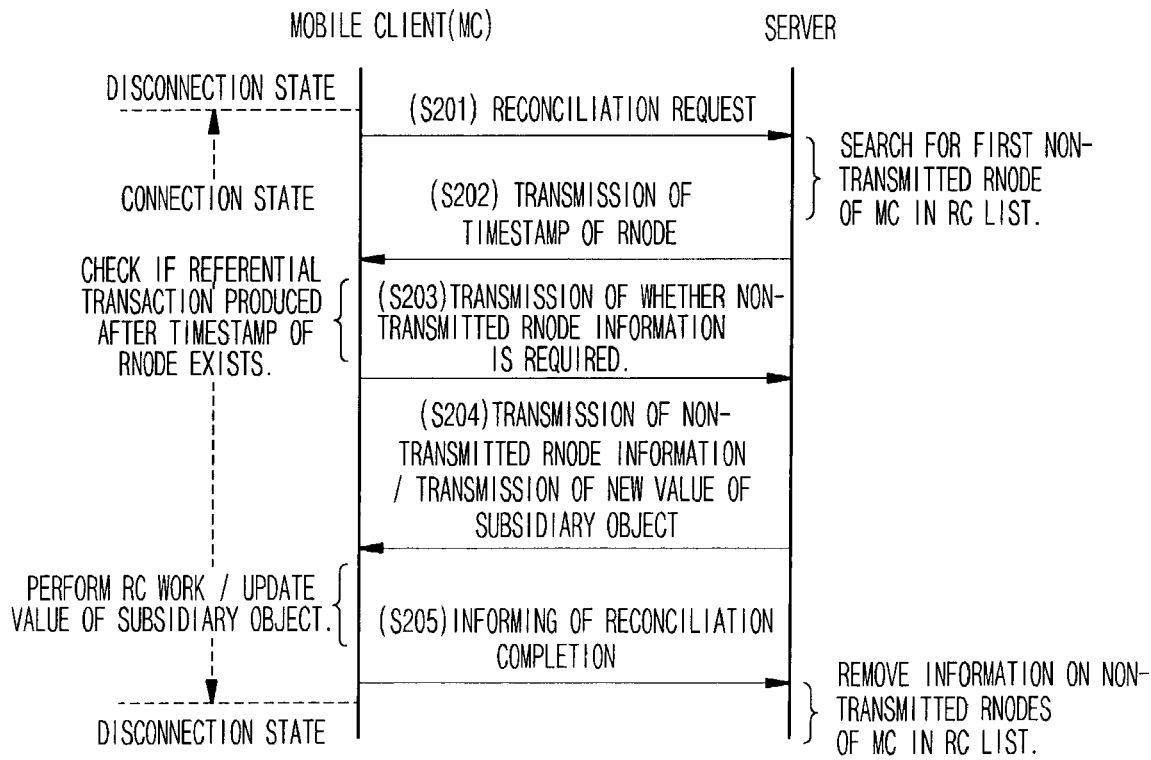
FIG. 2 is a flowchart illustrating an RC protocol processing procedure according to the present invention.

FIG. 2 is a flowchart illustrating the RC protocol processing procedure according to the present invention.

As shown in FIG. 2, the reconciliation work between the server and the mobile client is performed according to an RC protocol.

Respective steps of such an RC protocol will now be explained in detail.

First, the mobile client reconnects to the server after the disconnection from the server, and requests the RC work for the disconnection period (step S201).

Accordingly, the server checks the RC list, and transmits the TS value of the firstly produced mode among non-transmitted modes by the checkout subsidiary objects to the mobile client that requested the RC work (step S202).

Then, the mobile client searches whether a referential transaction produced after the time stamp received from the server exists in its own log file. If the referential transaction exists, the mobile client requests the RC information to the server, while if not, it informs that the RC is unnecessary (step S203).

At this time, if the mobile client requests the RC information, the server transmits information on the non-transmitted modes for the client. Also, in case that the RC information is unnecessary, the mobile client transmits the newest value of the checkout subsidiary object (step S204).

The mobile client detects the conflict according to the performing of the RC work by combining the mode information transmitted from the server with its own log. If the conflict is detected, the mobile client resolves the conflict, and informs the completion of the RC to the server (step S205).

If the server receives the successful completion of the RC work from the mobile client, it removes the mode information, which was transmitted to the mobile client, from the RC list.

Hereinafter, the conflict detection and resolution method according to the present invention will be explained in detail.

For example, the conflict may be produced when the checked-out subsidiary object is changed through the server in a state that the subsidiary object has already been write-referred to by the client.

The detection of the data conflict is performed through the mode of the RC list. That is, the mobile client detects the conflict in the referential transaction that uses the specified subsidiary object by combining the mode information from the server with its own log.

If the conflict is produced between the referential transaction performed by the mobile client during the disconnection state and the log information of the mode, since the server is the master copy with respect to the checkout subsidiary object, the referential transaction performed by the mobile client is undone, and then the conflict is resolved through the specified rule.

The specified rule is called a compensation transaction, and is prepared by a developer in the applications achieved by applying the present invention.

As described above, according to the method for data synchronization and update conflict resolution between mobile clients and a server in a mobile system according to the present invention, the data used for the applications of the mobile DB are regionally processed by the user and the application characteristics in data write and read operations, and only the data is copied corresponding to the applications by applications and by clients for the applications in which the security level of the consistency and reliability of the data processing is not relatively severe, so that the overhead of the synchronization and the conflict detection and resolution can be reduced.

While the method for data synchronization and update conflict resolution between mobile clients and a server in a mobile system according to the present invention has been described and illustrated herein with reference to the preferred embodiment thereof, it will be understood by those skilled in the art that various changes and modifications may be made to the invention without departing from the spirit and scope of the invention, which is defined in the appended claims.

What is claimed is:

1. A method for data synchronization and update conflict resolution between a plurality of mobile clients and a database (DB) server in a mobile system, the method comprising:
a copy management step of copying data of a server-side DB into a client-side built-in DB and the server managing contents of copying and a copying time;
a data synchronization step of synchronizing changed data between the mobile clients and the DB server with respect to a data change produced during a disconnection state of the mobile clients in accordance with a request from the mobile clients after a reconnection of the mobile clients; and
a conflict detection and resolution step of detecting an error that damages consistency of the data in the data synchronization process and resolving the detected error;
wherein in the copy management step,
the mobile client
(i) checks out from the server (a) main object disjoint fragments for a specified main object and (b) at least a subsidiary object different from and associated with the main object, and
(ii) copies the main object disjoint fragments into its own DB for use during the disconnection state, and
the server
(iii) allows a master copy of the checked-out subsidiary object maintained at said server to be available for downloading and updating by mobile clients other than the mobile client checking out the checked-out subsidiary object, wherein copies of the checked-out subsidiary object exist not only at the server and said mobile client, but also at other mobile clients, and
(iv) makes the checked-out main object fragments maintained at said server unavailable for loading or updating by the other mobile clients, wherein copies of the checked-out main object fragments exist only at the server and said mobile client, and not at any other mobile clients.

2. The method of claim 1, wherein:
wherein in the copy management step, the mobile client requests the main object disjoint fragments by submitting to the server information on a main object to be checked-out, a fragmentation selection criterion of the checked-out main object, and a list of subsidiary objects to be checked-out with the checked-out main object, and the server performs a fragmentation of the checked-out main object according to the fragmentation selection criterion, and transmits the checked-out main object disjoint fragments and copies of the checked-out subsidiary objects, which are in a write-subordinate relation with the disjoint fragments, to the mobile client.

3. The method of claim 2, wherein the data synchronization step is performed according to a specified reconciliation (RC) protocol, and comprises the steps of:
the mobile client reconnecting to the server and requesting a RC for the disconnection period;
the server checking an RC list and transmitting a time stamp value of firstly produced nodes among non-transmitted nodes by checkout subsidiary objects to the mobile client that requested the RC;
the mobile client searching whether a referential transaction produced after the time stamp exists;
the mobile client requesting the RC information to the server if the referential transaction exists;
the mobile client informing that the RC is unnecessary if the referential transaction does not exist;
the server transmitting node information on the non-transmitted nodes to the mobile client if RC information is requested;
the server transmitting a latest value of the checkout subsidiary object to the mobile client if the RC information is unnecessary;
the mobile client performing the RC by combining the node information transmitted from the server; and
the server removing, from the RC list, the node information transmitted to the mobile client if the RC is completed.

4. The method of claim 2, wherein in the conflict detection and resolution step, the mobile client detects the conflict in a referential transaction that uses the checkout subsidiary object by combining the node information from the server with its own log, and if the conflict is detected between the referential transaction and the log information of the node, undoing the referential transaction and resolving the conflict according to a specified rule of a compensation transaction.

5. The method of claim 1, wherein the data synchronization step is performed according to a specified reconciliation (RC) protocol, and comprises the steps of:
the mobile client reconnecting to the server and requesting an RC for work performed during the disconnection state;
the server checking an RC list and transmitting a time stamp value of a firstly produced mode among non-transmitted modes by checkout subsidiary objects to the mobile client that requested the RC;
the mobile client searching whether a referential transaction produced after the time stamp exists;
the mobile client requesting RC information from the server if the referential transaction exists;
the mobile client informing the server that the RC is unnecessary if the referential transaction does not exist;
the server transmitting mode information on the non-transmitted modes to the client if RC information is requested by the mobile client;
the server transmitting a latest value of the checkout subsidiary object if the mobile client informs the server that RC information is unnecessary;
the mobile client performing the RC work by combining the mode information transmitted from the server; and
if the RC work of the mobile client is completed, the server removing the mode information transmitted to the mobile client from the RC list.

6. The method of claim 5, wherein in the conflict detection and resolution step, the mobile client detects the conflict in a referential transaction that uses the checkout subsidiary object by combining the mode information from the server with its own log, and if the conflict is detected between the referential transaction and the log information of the mode, undoing the referential transaction and resolving the conflict according to a specified rule of a compensation transaction.

7. The method of claim 1, wherein the checked-out main object fragments maintained at said server are invisible to the other mobile clients until said mobile client has checked-in the fragments back into the server.

8. The method of claim 1, wherein, in the copy management step,
the master copy of the checked-out subsidiary object is maintained at said server, and
a master copy of the checked-out main object fragments is maintained at said mobile client until said mobile client has checked-in the checked-out main object fragments back into the server at which time the server again becomes the master of the main object fragments and makes said main object fragments available for downloading by any one of the mobile clients.

9. The method of claim 8, wherein the main object is independently operable at the mobile clients in the disconnection state; and the subsidiary object is referred to when the main object is independently operated at any of the mobile clients in the disconnection state.

10. The method of claim 9, wherein the checked-out main object and subsidiary object are cached together in said mobile client.

11. The method of claim 9, wherein, when the checked-out main object is operated at said mobile client in the disconnection state, no direct conflict in the checked-out main object with other mobile clients is produced, and only indirect conflicts in the checked-out subsidiary object with other mobile clients are subject to conflict detection and resolution in the conflict detection and resolution step.

12. A method for data synchronization and update conflict resolution between a plurality of mobile clients and a database (DB) server in a mobile system, the method comprising:

a copy management step of copying data from the server to a first mobile client among the plurality of mobile clients;

a data synchronization step of synchronizing changed data between the first mobile client and the server, with respect to a data change occurred during a disconnection state of the first mobile client, in accordance with a request from the first mobile client after a reconnection of the first mobile client; and a conflict detection and resolution step of detecting an error that damages consistency of the data in the data synchronization step and resolving the detected error;

wherein in the copy management step, the first mobile client requests to check out from the server (a) main object disjoint fragments of a specified main object and (b) at least a subsidiary object different from and associated with the main object;

the server transmits the checked-out main object disjoint fragments and a copy of the checked-out subsidiary object to the first mobile client;

the first mobile client copies the checked-out main object disjoint fragments transmitted from the server into a DB of said first mobile client for use during the disconnection state;

the server maintains a master copy of the checked-out subsidiary object and makes said master copy available for downloading and updating by mobile clients other than the first mobile client; and the server makes the checked-out main object fragments unavailable for checking-out or updating by the other mobile clients until the first mobile client has checked-in the main object fragments back into the server.

13. The method of claim 12, wherein when the first mobile client checks-in the main object fragments back into the server, values of the checked-out main object fragments stored in the server are replaced by values of the checked-out main object fragments transmitted from the first mobile client.

14. The method of claim 13, wherein the main object to be checked-out is an object that is independently operable in the respective client and is re-combinable with the consistency in meaning.

15. The method of claim 14, wherein the subsidiary object is updateable only in the server.

* * * * *